US009055232B2

(12) United States Patent
Nashizawa

(10) Patent No.: US 9,055,232 B2
(45) Date of Patent: Jun. 9, 2015

(54) IMAGE PROCESSING APPARATUS CAPABLE OF ADDING SOFT FOCUS EFFECTS, IMAGE PROCESSING METHOD, AND STORAGE MEDIUM

(75) Inventor: Hiroaki Nashizawa, Tokyo (JP)

(73) Assignee: CANON KABUSHIKI KAISHA (JP)

( * ) Notice: Subject to any disclaimer, the term of this patent is extended or adjusted under 35 U.S.C. 154(b) by 667 days.

(21) Appl. No.: 13/213,348

(22) Filed: Aug. 19, 2011

(65) Prior Publication Data

US 2012/0044385 A1 Feb. 23, 2012

(30) Foreign Application Priority Data

Aug. 20, 2010 (JP) ................. 2010-185459

(51) Int. Cl.
| | |
|---|---|
| H04N 5/262 | (2006.01) |
| G06K 9/40 | (2006.01) |
| H04N 5/232 | (2006.01) |
| G06T 5/00 | (2006.01) |
| G06T 5/10 | (2006.01) |
| G06T 5/40 | (2006.01) |

(52) U.S. Cl.
CPC ........... *H04N 5/262* (2013.01); *H04N 5/23212* (2013.01); *G06T 5/002* (2013.01); *G06T 5/10* (2013.01); *G06T 5/40* (2013.01); *G06T 2207/20048* (2013.01)

(58) Field of Classification Search
CPC .............. H04N 5/2621; H04N 5/2326; H04N 5/23212; G06T 5/004; G06T 5/002
USPC ................................. 348/239, 222.1; 382/264
See application file for complete search history.

(56) References Cited

U.S. PATENT DOCUMENTS

| | | | | |
|---|---|---|---|---|
| 6,198,844 | B1* | 3/2001 | Nomura | 382/260 |
| 6,560,374 | B1 | 5/2003 | Enomoto | |
| 6,807,316 | B2* | 10/2004 | Enomoto | 382/264 |
| 7,683,944 | B2* | 3/2010 | Horita | 382/264 |
| 2009/0040321 | A1* | 2/2009 | Nakamura | 348/222.1 |
| 2010/0045825 | A1* | 2/2010 | Hatori et al. | 348/241 |
| 2012/0063697 | A1* | 3/2012 | Han et al. | 382/255 |

FOREIGN PATENT DOCUMENTS

| | | |
|---|---|---|
| JP | 2001-298619 A | 10/2001 |
| JP | 2007-065784 A | 3/2007 |
| JP | 2007-259404 A | 10/2007 |

OTHER PUBLICATIONS

Japanese Office Action cited in Japanese counterpart application No. JP2010-185459, dated Apr. 1, 2014.

* cited by examiner

*Primary Examiner* — Nhan T Tran
(74) *Attorney, Agent, or Firm* — Rossi, Kimms & McDowell LLP

(57) ABSTRACT

An image processing apparatus which is capable of adding the same soft focus effects to images different in image size irrespective of the types of image scenes. A soft focus processing section acquires an input image. Then, the soft focus processing section acquires a shooting condition for the input image. Further, the soft focus processing section generates a plurality of blurred images different in degree of blur from the input image. The input image and at least one of the blurred images are synthesized. In doing this, a synthesis ratio between the images to be synthesized is set based on the shooting condition for the input image.

15 Claims, 16 Drawing Sheets

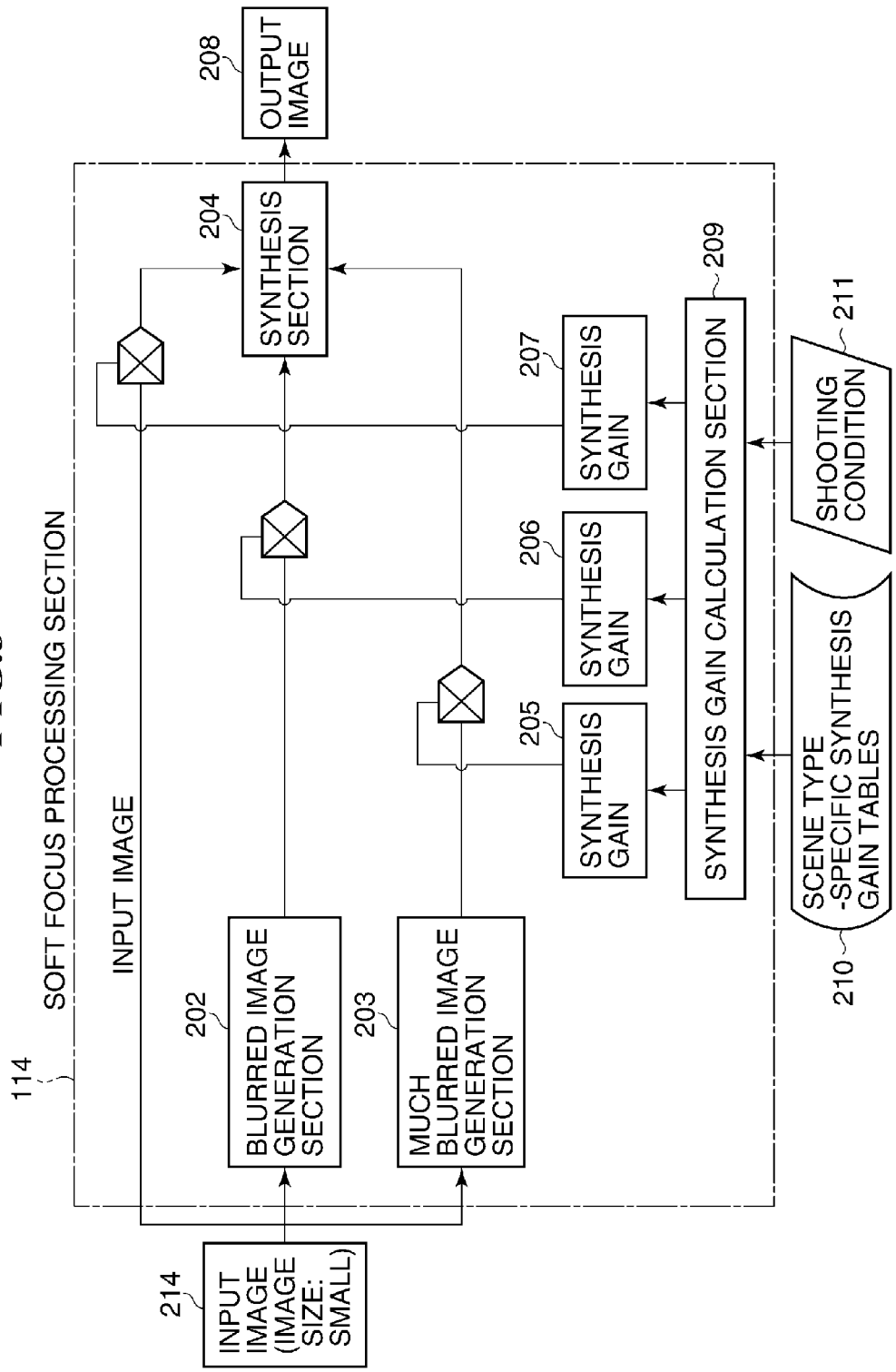

IMAGE PROCESSING APPARATUS CAPABLE OF ADDING SOFT FOCUS EFFECTS, IMAGE PROCESSING METHOD, AND STORAGE MEDIUM

BACKGROUND OF THE INVENTION

1. Field of the Invention

The present invention relates to an image processing apparatus, and more particularly to an image processing apparatus which is capable of giving soft focus effects to digital image data, an image processing method, and a storage medium.

2. Description of the Related Art

There are various types of photographic camera lenses including soft focus lenses. A soft focus lens enables an image to be formed as if light were exuding from a highlighted portion of the image. Many of the soft focus lenses intentionally causes spherical aberration to thereby generate a soft-looking image.

Further, there has been known a method in which soft focus effects are obtained not by providing a lens with a soft focus function, but by using a filter. In this case, by mounting the filter at a front end of a photographic lens to thereby restrict light that passes through the filter, it is possible to achieve the same effects as obtained when shooting is performed using a soft focus lens, i.e. the effects of making the outline of a picked-up image slightly blurred.

In recent years, to achieve the soft focus effects by image processing has been proposed as one of methods of expressing an image picked up by a digital camera as a photograph. For example, a method has been proposed in which a blurred image is generated from an original image, and the blurred image is synthesized with the original image at a predetermined transmittance (see Japanese Patent Laid-Open Publication No. 2007-065784). In this technique, when the transmittance is set to 0%, the original image is used, and when the transmittance is set to 100%, the blurred image is used. The blurred image can be generated by applying a 2D Gaussian filter to the original image. Further, in Japanese Patent Laid-Open Publication No. 2007-065784, a method has been proposed e.g. in which instead of setting a uniform transmittance for en entire image plane, a face area is detected and a lower transmittance is set for the detected face area and a high-luminance portion is detected and a higher transmittance is set for the detected high-luminance portion. By thus adaptively changing an area to be soft-focused, it is possible to enhance the soft focus effects.

On the other hand, there has been proposed a method in which when synthesizing an original image and a blurred image at a certain addition ratio, the addition ratio at the time of monitoring is set differently from that at the time of printing (see U.S. Pat. No. 6,560,374). According to the method disclosed in U.S. Pat. No. 6,560,374, it is possible to add substantially the same soft focus effects to a small-sized image for monitor display and a large-sized image for printing.

As described above, by synthesizing an original image and a blurred image, it is possible to obtain the soft focus effects. However, the method disclosed in Japanese Patent Laid-Open Publication No. 2007-065784 suffers from a problem that when the data size of an original image is changed e.g. by a resizing process, the soft focus effects look different between a large-sized image and a small-sized image.

Further, in the technique disclosed in U.S. Pat. No. 6,560,374, the frequency characteristic of an input image is not taken into consideration, and hence the soft focus effects vary between images of different object types, such as a portrait and a landscape shot.

SUMMARY OF THE INVENTION

The present invention provides an image processing apparatus which is capable of adding the same soft focus effects to images different in image size irrespective of the types of image scenes.

In a first aspect of the present invention, there is provided an image processing apparatus comprising a first acquisition unit configured to acquire an input image, a second acquisition unit configured to acquire a shooting condition for the input image, a generation unit configured to generate a plurality of blurred images different in degree of blur from the input image, a synthesis unit configured to synthesize the input image and at least one of the blurred images generated by the generation unit, and a setting unit configured to set a synthesis ratio between the images to be synthesized, based on the shooting condition acquired by the second acquisition unit for the input image.

In a second aspect of the present invention, there is provided a method of controlling an image processing apparatus, which is executed by at least one processor provided in the image processing apparatus, comprising acquiring an input image, acquiring a shooting condition for the input image, generating a plurality of blurred images different in degree of blur from the input image, synthesizing the input image and at least one of the generated blurred images, and setting a synthesis ratio between the images to be synthesized, based on the acquired shooting condition for the input image.

In a third aspect of the present invention, there is provided a non-transitory computer-readable storage medium storing a computer-readable program for causing a computer to execute a method of controlling an image processing apparatus, wherein the method comprises acquiring an input image, acquiring a shooting condition for the input image, generating a plurality of blurred images different in degree of blur from the input image, synthesizing the input image and at least one of the generated blurred images, and setting a synthesis ratio between the images to be synthesized, based on the acquired shooting condition for the input image.

According to the present invention, it is possible to add the same soft focus effects to images different in image size irrespective of the types of image scenes. That is, it is possible to achieve substantially the same soft focus effects even in images different in image size, with a viewing size at the same angle of view.

Further features of the present invention will become apparent from the following description of exemplary embodiments with reference to the attached drawings.

BRIEF DESCRIPTION OF THE DRAWINGS

FIG. 5 is a schematic block diagram useful in explaining soft focus processing executed by the soft focus processing section provided in the image processing apparatus in FIG. 1.

DESCRIPTION OF THE EMBODIMENTS

The present invention will now be described in detail below with reference to the accompanying drawings showing embodiments thereof. An image processing method according to a first present invention can be applied to an image which is picked up by a photographing system of a digital camera or the like, using a photographic lens, and is formed by a plurality of color planes. For this reason, an image processing apparatus, such as a digital camera, having a photographing system is taken as an example of the image processing apparatus according to the present embodiment. Note that RAW data or JPEG subjected to development processing can be mentioned as an image to which the image processing method of the present invention can be applied, but this is not limitative.

Figure 1:
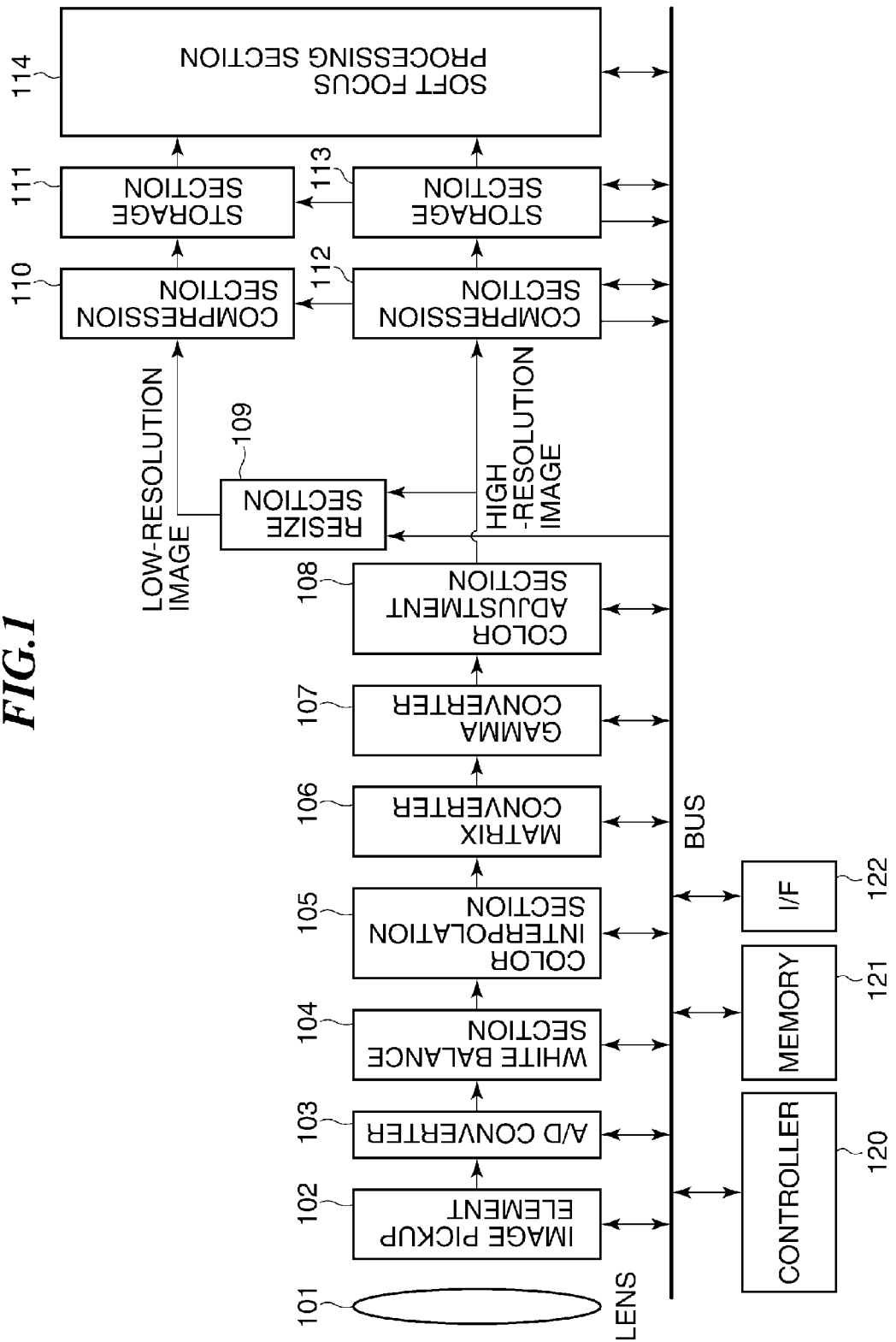
FIG. 1 is a schematic block diagram of an image processing apparatus according to a first embodiment of the present invention.

First, a brief description will be given of the image processing apparatus according to the present embodiment. FIG. 1 is a schematic block diagram of the image processing apparatus. The image processing apparatus includes an imaging optical system (lenses) 101, an image pickup element 102, an A/D converter 103, a white balance section 104, a color interpolation section 105, a matrix converter 106, a gamma converter 107, a color adjustment section 108, and a resize section 109. Further, the image processing apparatus includes two compression sections 110 and 112, two storage sections 111 and 113, a soft focus processing section 114, a controller 120, a memory 121, and an interface (I/F) 122.

Referring to FIG. 1, reflected light from an object passes through the imaging optical system (lenses) 101 to form an image on the image pickup element 102 which photoelectrically converts an object image. The image pickup element 102 is implemented e.g. by a single-plate color image pickup element provided with a general primary color filter. The primary color filter comprises three kinds of color filters having main transmission wavelength bands close to respective wavelengths of 650 nm, 550 nm, and 450 nm, and color planes corresponding to respective bands of R (red), G (green), and B (blue) are picked up.

In the single-plate color image pickup element, a color filter for each color is spatially arranged on a pixel-by-pixel basis, and hence only the intensity of a single color plane can be obtained in association for each pixel. For this reason, a color mosaic image is output from the image pickup element 102. The A/D converter 103 converts the color mosaic image output as an analog voltage from the image pickup element 102 into digital data suitable for image processing executed at later stages.

The white balance section 104 performs processing for expressing white as white. Specifically, R, G, and B are multiplied by respective gains such that R, G, and B in a white area achieve color matching. In the color interpolation section 105, the color mosaic image is interpolated, whereby a color image having color information on R, G, and B in association with all the pixels is generated. The generated color image is passed through the matrix converter 106 and the gamma converter 107, whereby a basic color image is generated.

In the color adjustment section 108, the basic color image is subjected to processing for improving the appearance of an image, such as image correction including noise reduction, chroma emphasis, hue correction, and edge emphasis. In the present embodiment, an image having undergone desired color adjustment will be referred to as "a large-sized image". The large-sized image is stored in the memory 121, or stored in the storage section 113 after having been compressed e.g. according to JPEG by the compression section 112. Note that the storage section 113 is implemented by a storage medium, such as a flash memory.

An image is sometimes stored after reducing its image size according to the shooting configuration of the image processing apparatus. In this case, the resize section 109 reduces the image to a desired size. In the present embodiment, the thus reduced image will be referred to as "a small-sized image". The small-sized image is stored in the memory 121 or is stored in the storage section 111 after having been compressed e.g. according to one of standards, such as JPEG, by the compression section 110. Note that the storage section 111 is implemented by a storage medium, such as a flash memory.

The soft focus processing section 114 performs soft focus processing on the large-sized image or the small-sized image thus subjected to development processing. The construction of the soft focus processing section 114 will be described in detail hereinafter.

Data including image data and shooting information used by the processing sections as components of the image processing apparatus is stored in the memory 121. The controller 120 controls the processing sections, i.e. the overall operation of the image processing apparatus. An instruction given through an operation externally performed by the user on the apparatus is input to the image processing apparatus via the interface 122.

Various processes described hereafter are realized by the controller 120 executing predetermined programs, thereby controlling the processing sections such that the functions of the respective processing sections are achieved.

Figure 2:
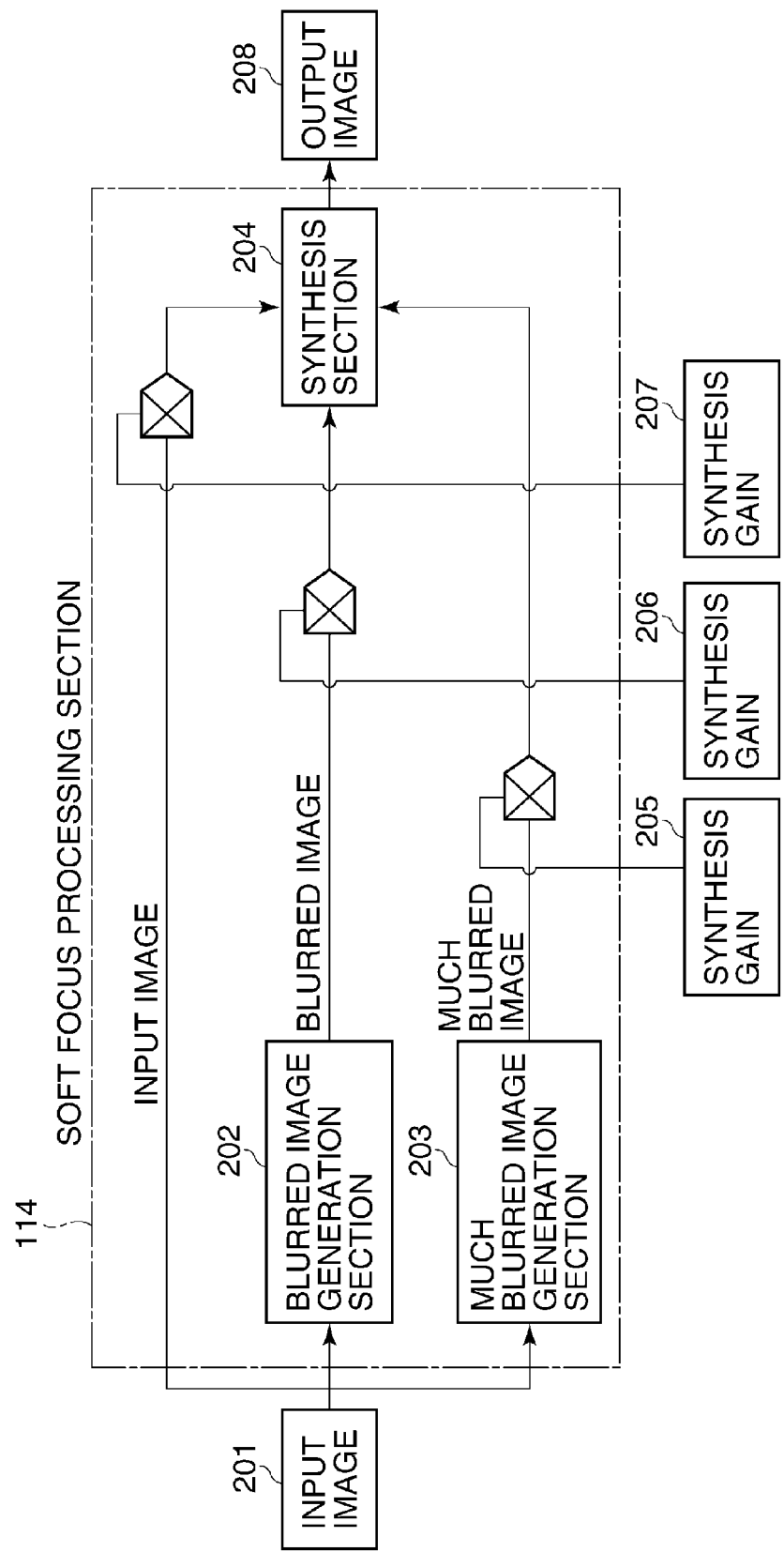
FIG. 2 is a schematic block diagram useful in explaining soft focus processing executed by a soft focus processing section provided in the image processing apparatus in FIG. 1.

FIG. 2 is a schematic block diagram useful in explaining soft focus processing executed by the soft focus processing section 114. Note that in FIG. 2, only part of the soft focus processing commonly required for execution of the soft focus processing on both a large-sized input image and a small-sized input image is depicted.

Briefly, soft focus effects are realized by synthesizing an input image 201, a blurred image generated by a blurred image generation section 202, and a much blurred image generated by a much blurred image generation section 203, at a predetermined synthesis ratio. The "blurred image" is an image formed by blurring an input image, i.e. more specifically an image obtained by reducing the high-frequency components of the input image. The "blurred image" and the "much blurred image" are different in the degree of blur, and the degree of reduction of high-frequency components in the "much blurred image" is larger than that in the "blurred image".

In the present processing method, some of the components of the input image 201 are left. This makes it possible to firmly retain an original form of an object when a softer look (soft focus effects) is given thereto compared with the processing of simply blurring the input image 201. Further, not only the input image 201 and the much blurred image but also the blurred image as an intermediate image therebetween is synthesized in a mixed manner, so that it is possible to prevent an unnatural look from being created due to a drastic spatial change in the degree of blur. Although in the present embodiment, two blurred images, i.e. the blurred image and the much blurred image are used, this is not limitative, but more images different in the degree of blur may be used to synthesize an output image 208.

A synthesis section 204 multiplies the input image 201 by a synthesis gain 207, the blurred image by a synthesis gain 206, and the much blurred image by a synthesis gain 205, and then adds up these images. Thus, the output image 208 is thus synthesized to give the soft focus effects thereto, and is output from the synthesis section 204. Each of the synthesis gains 205 to 207 is in a range of 0 to 1, and the synthesis gains 205 to 207 are set such that the total of these is equal to 1.

Figure 3:
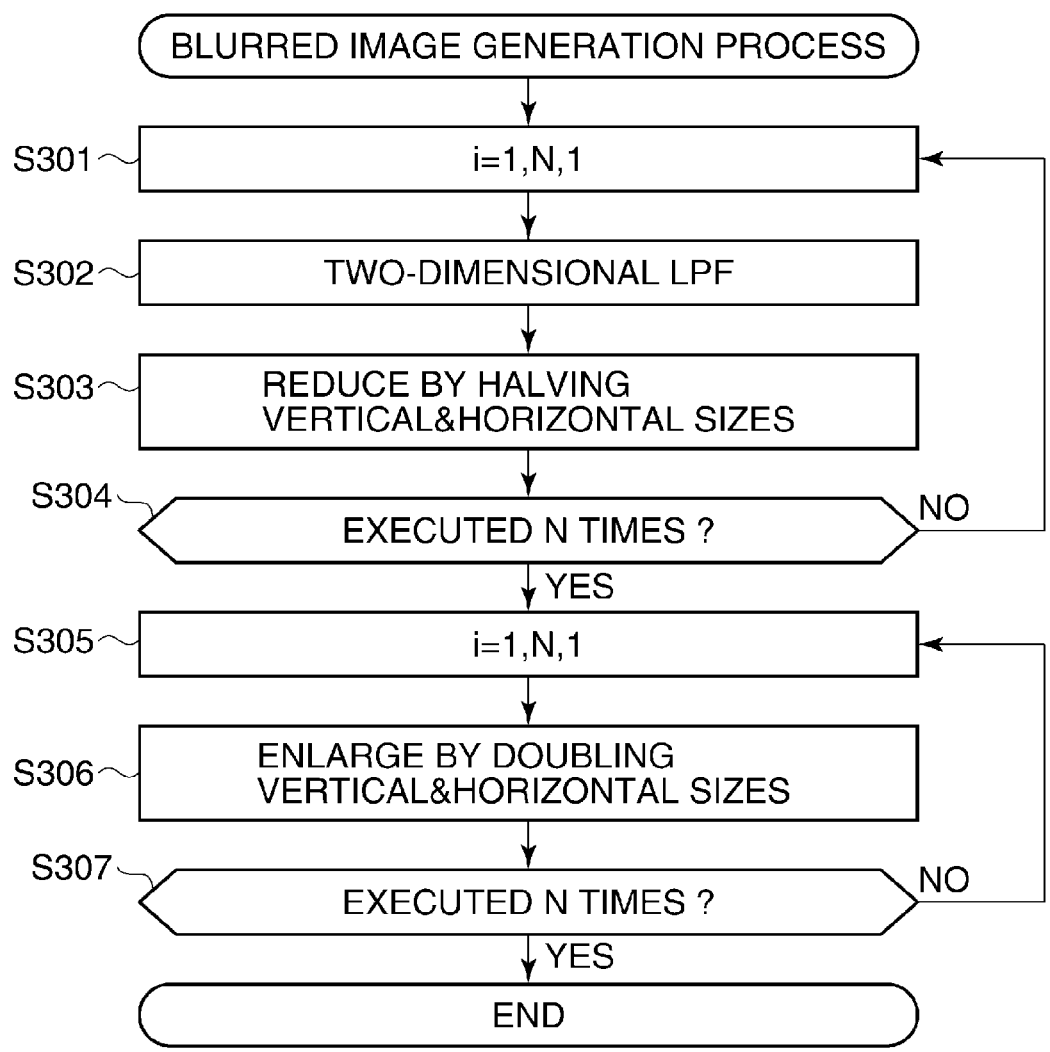
FIG. 3 is a flowchart of a blurred image generation process executed by the soft focus processing section appearing in FIG. 2.

FIG. 3 is a flowchart of a blurred image generation process executed by the soft focus processing section 114 including the blurred image generation section 202 and the much blurred image generation section 203. There are several methods of generating a blurred image or a much blurred image, and as one of them can be mentioned a method in which an image is smoothed by two-dimensionally (vertically and horizontally) filtering an image using low-pass filters implemented by Gaussian filter coefficients.

However, in order to realize a desired degree of blur using the above-mentioned method, it is required to increase the kernel size, and hence processing time is inevitably made very much longer. Therefore, it is not practical for the image processing apparatus to perform the processing. To overcome this problem, according to the present embodiment, reduction processing and enlargement processing are combined so as to reduce processing time and obtain a desired degree of blur at the same time.

First, a target reduction size is set (step S301). For example, for a blurred image, the target reduction size is set to a ¼ size for each side, such that the size of each side of an original image is reduced to one forth, and for a much blurred image, the target reduction size is set to a ¹⁄₁₆ size for each side, such that the size of each side of the original image is reduced to one sixteenth. This makes it possible to change the degree of blur. In the step S301 in FIG. 3, [i=1, N, 1] indicates that the initial value of a variable i is set to 1 and the variable i is incremented 1 by 1 until it reaches a value of N. The value of N represents the number of times of execution of the present process. In the present process, since each side is reduced to ½ in a step S303, referred to hereinafter, N is set to "2" in the case of reducing each side to ¼, while in the case of reducing each side to ¹⁄₁₆, N is set to "4". Thus, the steps S301 et seq. are executed for each of the blurred image and the much blurred image.

After execution of the step S301, processing for smoothing the image by two-dimensionally (vertically and horizontally) applying a low-pass filter (LPF) having a filter coefficient of [1, 2, 1] is executed before the reduction processing so as to prevent reflected noise (so-called moire) of the high-frequency components from being generated by the reduction processing (step S302). Then, reduction processing is performed such that the vertical and horizontal sizes of the image are each halved (step S303), and it is determined whether or not the reduction processing has been performed N times (step S304). If the reduction processing has not been performed N times (NO to the step S304), the process returns to the step S302. If the reduction processing has been performed N times (YES to the step S304), the process proceeds to a step S305 so as to perform the enlargement processing.

The enlargement processing is performed similarly to the reduction processing. In the step S305, the variable i for the enlargement processing is set in the same manner as for the reduction processing. Then, enlargement processing is performed such that the vertical and horizontal sizes of the image are each doubled (step S306), and it is determined whether or not the enlargement processing has been performed N times (step S307). If the enlargement processing has not been performed N times (NO to the step S307), the process returns to the step S306. If the enlargement processing has been performed N times (YES to the step S307), the process is terminated. An image generated by processing of temporarily reducing an input image to a smaller-size image by setting the value N to a larger value and then restoring the size of the reduced image to an original size is the much blurred image. This processing is executed by the much blurred image generation section 203 of the soft focus section 114 appearing in FIG. 2. On the other hand, an image generated by setting the value N to a smaller value so as not to reduce an input image to such a degree as in the case of generating the much blurred image is the blurred image. This processing is executed by the blurred image generation section 202 of the soft focus section 114.

When the input image 201 is a large-sized image, the generated blurred image and much blurred image are multiplied by the respective synthesis gains 206 and 205 selectively and suitably set for the large-sized image, and are finally synthesized by the synthesis section 204. The synthesis gains 206 and 205 for the large-sized image are set e.g. by the controller 120. Thus, a soft focus image of the large-sized image can be obtained.

Although in the present embodiment, the magnification ratio is set to ½ for reduction (the vertical and horizontal sizes are each halved), this is not limitative, but the magnification ratio may be set to ¼ for reduction, for example, or a magnification different from these may be employed. In this case, however, it is required to change the filter coefficient of the low-pass filter for image filtering, in accordance with the change in the magnification ratio for reduction. For example, when the magnification ratio for reduction is changed to ¼, it is required to set the filter coefficient to [1, 4, 6, 4, 1].

The soft focus effects are quantitatively dealt with so as to achieve the same soft focus effects whatever size the input image 201 has. First, transfer characteristics in a frequency range of the soft focus processing performed on a large-sized input image are analyzed. Similarly, transfer characteristics in a frequency range of the soft focus processing performed on a small-sized input image using selected synthesis gains are analyzed.

Figure 4:
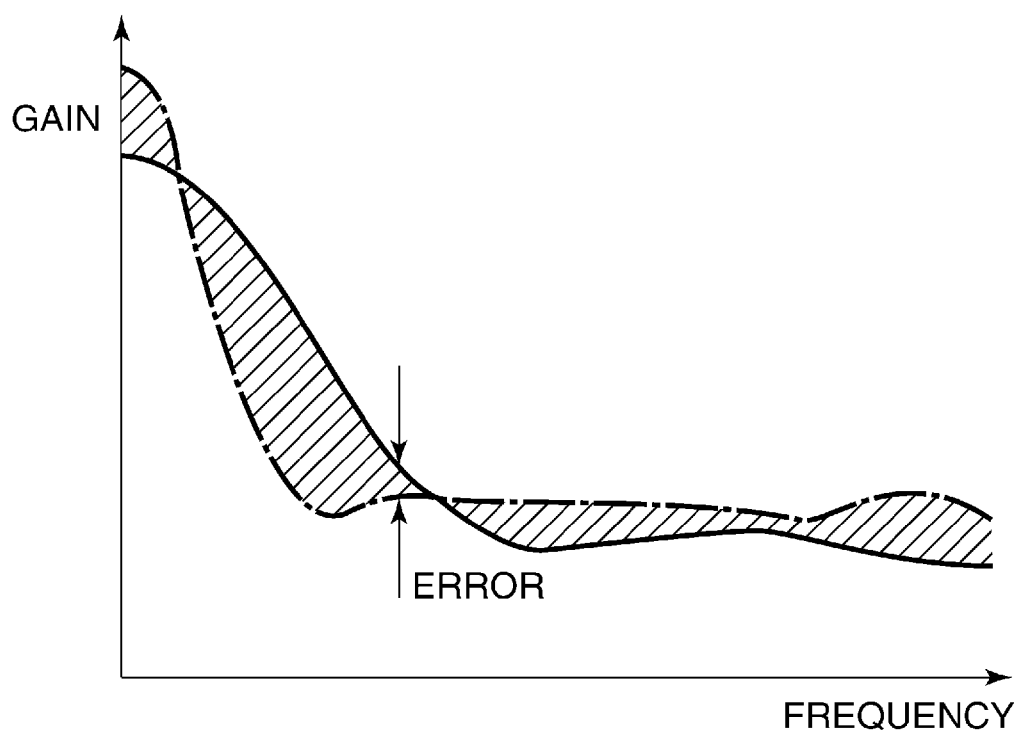
FIG. 4 is a diagram showing transfer characteristics in a frequency range of the soft focus processing performed on an input image.

FIG. 4 is a diagram showing transfer characteristics in a frequency range of the soft focus processing performed on an input image. The horizontal axis represents the frequency, and the vertical axis represents the gain. In FIG. 4, a solid line represents the transfer characteristics in the frequency range of the soft focus processing performed on a large-sized input image, and a one-dot-chain line represents the transfer characteristics in the frequency range of the soft focus processing performed on a small-sized input image. Further, each of areas defined between the solid line and the one-dot-chain line (i.e. hatched areas in FIG. 4) represents an error between the two transfer characteristics (hereinafter simply referred to as "the error").

When the synthesis gains 205 to 207 for a small-sized input image are changed, the transfer characteristics in the frequency range of the soft focus processing also change. In other words, the synthesis gains 205 to 207 are set such that the errors appearing in FIG. 4 are eliminated, whereby it is possible to give the same soft focus effects to both the large-sized input image and the small-sized input image. The term "the same" means that it is possible to judge that the soft focus effects are substantially the same. In the following, a detailed description will be given of a method of setting the synthesis gains for a small-sized input image.

FIG. 5 is a schematic block diagram useful in explaining the soft focus processing executed by the soft focus processing section 114. The blurred image generation section 202, the much blurred image generation section 203, and the synthesis section 204 appearing in FIG. 5 are identical to those described with reference to FIG. 2, and therefore description thereof is omitted. The synthesis gains 205 to 207 for a small-sized input image, denoted by reference numeral 214 in this figure, are determined as described below, by a synthesis gain calculation section 209. On the other hand, the synthesis gains 205 to 207 for a large-sized input image are determined as described with reference to FIG. 2, without using the synthesis gain calculation section 209.

As described hereinbefore, in order to give the same soft focus effects to images different in image size, it is required to eliminate the errors shown in FIG. 4. However, when synthesis is performed using only three sheets of images as shown in FIG. 2, the number of sheets as a variable is insufficient, so that it is very difficult to eliminate the errors whatever values the synthesis gains 205 to 207 are set to. On the other hand, if the number of sheets of images for synthesis is increased to several tens of sheets or several hundreds of sheets, it is possible to set the synthesis gains such that the errors can be reduced as close as possible to zero, but the number of circuits is inevitably increased in this case. Therefore, this method is not practical when considering processing speed and memory capacity.

To solve this problem, in a gain setting method in the first embodiment, the synthesis gains 205 to 207 are set such that the errors are minimized instead of being completely eliminated, and for this purpose, a frequency range in which the errors are reduced is determined according to a scene of an input image. More specifically, the soft focus effects are tailored to a type of a scene of each input image, whereby it is possible to give soft focus effects very close to those given when the errors are eliminated. Now, first, a description will be given of frequency characteristics associated with typical scenes.

Figure 6A:
FIGS. 6A, 6B, and 6C are views illustrating examples of typical scenes.
Figure 6B:
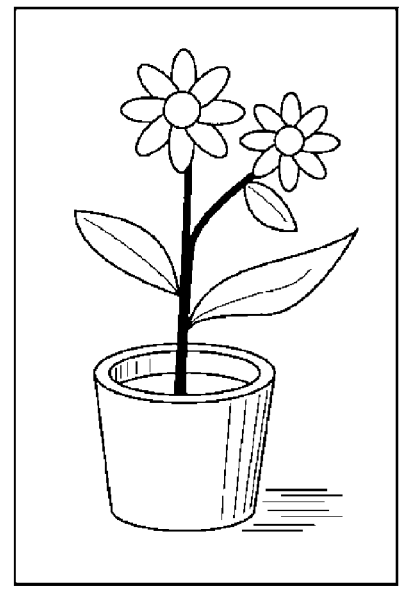
Figure 6C:
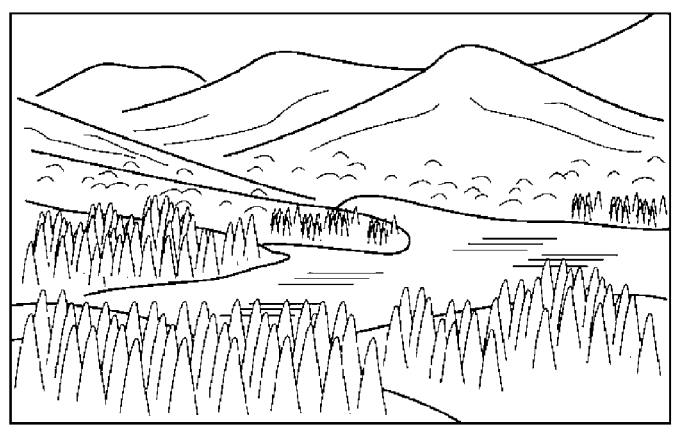
Figure 7:
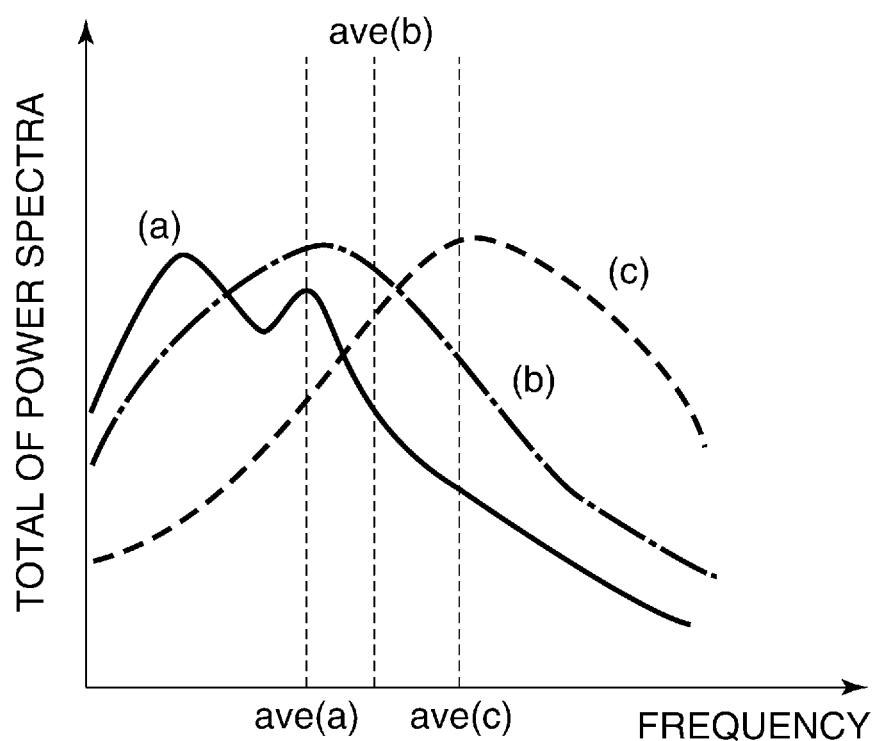
FIG. 7 is a diagram showing general frequency characteristics of the scenes illustrated in FIGS. 6A, 6B, and 6C, respectively.

FIGS. 6A, 6B, and 6C are views illustrating typical scenes, respectively. FIG. 6A illustrates a portrait scene, FIG. 6C illustrates a landscape scene, and FIG. 6B illustrates a normal scene other than a portrait scene and a landscape scene. FIG. 7 is a diagram showing general frequency characteristics of the scenes illustrated in FIGS. 6A, 6B, and 6C, respectively. The horizontal axis represents the frequency, and the vertical axis represents the total of power spectra. Note that the total of power spectra can be determined by subjecting an image to two-dimensional Fourier transformation to thereby determine a power spectrum (square of the absolute value) and adding up the obtained power spectra in all directions of 360 degrees about the origin.

In the case of shooting such a portrait scene as illustrated in FIG. 6A, an aperture, not shown, is generally set to an open side to blur the background of the portrait scene so as to make an object stand out. Therefore, the frequency characteristics of the scene basically have a peak in a low frequency range (see a curve (a) in FIG. 7). In the case of shooting such a landscape scene as illustrated in FIG. 6C, the aperture is generally stopped down so as to pick up even minute details of the scene clearly. Therefore, the frequency characteristics of the scene basically have a peak in a high frequency range (see a curve (c) in FIG. 7). The normal scene illustrated in FIG. 6B has intermediate frequency characteristics between the curve (a) in FIG. 7 and the curve (c) in FIG. 7. Note that ave (a), ave (b), and ave (c) represent the respective average frequencies of the frequency characteristics (a), (b), and (c).

In the gain setting method in the first embodiment, the frequency ranges for reducing the errors are determined according to the respective frequency characteristics (a) to (c) in FIG. 7. For example, in the case of the characteristics (a) in FIG. 7, the synthesis gains 205 to 207 are calculated such that they have values for minimizing the error within a frequency range of $\pm\alpha$ [m$^{-1}$] with the average frequency ave (a) in the center. As an index representing the degree of matching of transfer characteristics within a frequency range is used an RMS error which can be expressed by the following equation (1):

$$\text{RMS Error} = \frac{1}{n}\sum_{i=1}^{N}\sqrt{(L_{freq} - S_{freq})^2} \tag{1}$$

In the equation (1), $L_{freq}$ represents a gain of frequency characteristics in a frequency freq of soft focus processing for the large-sized input image. Further, $S_{freq}$ represents a gain of a frequency characteristic in a frequency freq of soft focus processing for the small-sized input image 214.

The synthesis gains 205 to 207 are calculated by the above-described method according to the scene type of an input image, and tables, such as Table 1, Table 2, and Table 3, are generated. Note that [synthesis gain 1], [synthesis gain 2], and [synthesis gain 3] appearing in each of Table 1, Table 2, and Table 3 correspond, respectively, to the synthesis gain 207 for an input image, the synthesis gain 206 for a blurred image, and the synthesis gain 205 for a much blurred image, each appearing in FIG. 5.

TABLE 1

Synthesis Gain Table for Portrait Scene

| | | image size | | |
|---|---|---|---|---|
| effect degree | | large | medium | small |
| Low | synthesis gain 1 | 0.6 | 0.6 | 0.6 |
| | synthesis gain 2 | 0.1 | 0.2 | 0.3 |
| | synthesis gain 3 | 0.3 | 0.2 | 0.1 |
| Normal | synthesis gain 1 | 0.4 | 0.4 | 0.4 |
| | synthesis gain 2 | 0.1 | 0.2 | 0.4 |
| | synthesis gain 3 | 0.5 | 0.4 | 0.2 |
| High | synthesis gain 1 | 0.2 | 0.2 | 0.2 |
| | synthesis gain 2 | 0.1 | 0.2 | 0.4 |
| | synthesis gain 3 | 0.7 | 0.6 | 0.4 |

TABLE 2

Synthesis Gain Table for Normal Scene

| | | image size | | |
|---|---|---|---|---|
| effect degree | | large | medium | small |
| Low | synthesis gain 1 | 0.5 | 0.5 | 0.5 |
| | synthesis gain 2 | 0.1 | 0.2 | 0.3 |
| | synthesis gain 3 | 0.4 | 0.3 | 0.2 |
| Normal | synthesis gain 1 | 0.3 | 0.3 | 0.3 |
| | synthesis gain 2 | 0.1 | 0.2 | 0.4 |
| | synthesis gain 3 | 0.6 | 0.5 | 0.3 |
| High | synthesis gain 1 | 0.1 | 0.1 | 0.1 |
| | synthesis gain 2 | 0.1 | 0.2 | 0.4 |
| | synthesis gain 3 | 0.8 | 0.7 | 0.5 |

TABLE 3

Synthesis Gain Table for Landscape Scene

| | | image size | | |
|---|---|---|---|---|
| effect degree | | large | medium | small |
| Low | synthesis gain 1 | 0.4 | 0.4 | 0.4 |
| | synthesis gain 2 | 0.1 | 0.2 | 0.3 |
| | synthesis gain 3 | 0.5 | 0.4 | 0.3 |
| Normal | synthesis gain 1 | 0.2 | 0.2 | 0.2 |
| | synthesis gain 2 | 0.1 | 0.2 | 0.4 |
| | synthesis gain 3 | 0.7 | 0.6 | 0.4 |
| High | synthesis gain 1 | 0.0 | 0.0 | 0.0 |
| | synthesis gain 2 | 0.1 | 0.2 | 0.4 |
| | synthesis gain 3 | 0.9 | 0.8 | 0.6 |

Tables 1 to 3 are stored in the memory 121 (see FIG. 1) in advance as preset scene type-specific synthesis gain tables 210. Values in the scene type-specific synthesis gain tables 210 are only examples, but since a landscape scene generally includes more objects containing high-frequency components than a portrait scene does, the values of synthesis gain 3 in Table 3 are set higher. Further, the ratio of synthesis gain 3 is set higher for a high effect degree than for a low effect degree. As for the image size, the effect of the soft focus processing is more conspicuous when it is small, and therefore as the image size is smaller, synthesis gain 3 is set lower.

In the soft focus processing in FIG. 5, the scene type of an input image is used as a shooting condition 211. The scene type of the input image is identified, a synthesis gain table for the identified scene type is selected from the scene type-specific synthesis gain tables 210, and then the synthesis gains 205 to 207 are determined in the synthesis gain calculation section 209.

By the way, there has conventionally been known a digital camera configured such that P (program priority), Av (aperture priority), Tv (time priority), M (manual), or the like mode can be selected as a shooting mode by a dial operation. Further, in recent years, a digital camera has generally been configured such that the user can select a desired one of a full automatic mode and shooting modes categorized from the viewpoint of the type of shooting scene, such as a portrait scene, a landscape scene, a sport scene, a macro scene, and a night-view scene, which are provided as shooting modes for beginners. Therefore, in the gain setting method in the first embodiment, a shooting mode (shooting scene) selected by a user is utilized to set the scene type of an input image.

Figure 8:
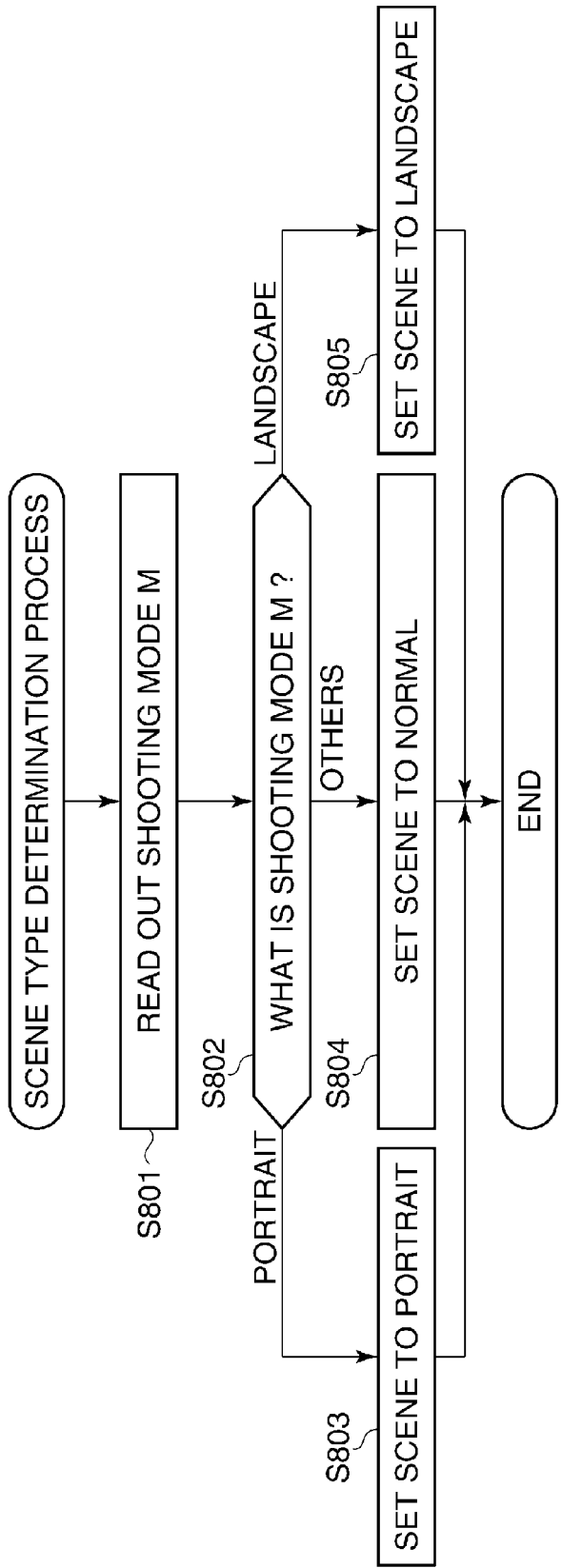
FIG. 8 is a flowchart of a scene type determination process for selecting a synthesis gain table associated with the scene of an input image from scene type-specific synthesis gain tables.

FIG. 8 is a flowchart of a scene type determination process for selecting a synthesis gain table associated with the scene type of an input image from the scene type-specific synthesis gain tables 210. The present process is executed by the controller 120. First, a shooting mode M is read out from the memory 121 (step S801). Then, the read-out shooting mode M is determined (step S802). If it is determined that the shooting mode M is a portrait mode, the process proceeds to a step S803, wherein the scene type of the input image is set as portrait. If it is determined that the shooting mode M is a landscape mode, the process proceeds to a step S804, wherein the scene type of the input image is set as landscape. If it is determined that the shooting mode M is neither the portrait mode nor the landscape mode, the process proceeds to a step S805, wherein the scene type of the input image is set as normal.

A synthesis gain table associated with the scene type set in one of the steps S803 to S805 is read out from the scene type-specific synthesis gain tables 210, and a combination of synthesis gains 1 to 3 in the table is determined as synthesis gains 205 to 207. In doing this, the size of the input image 214 and the degree (low, normal, or high) of the soft focus effects are taken into consideration. For example, when the size of an input image is medium and the effect degree is high in a scene determined as the landscape scene, synthesis gain 1 is set to 0.0, synthesis gain 2 to 0.2, and synthesis gain 3 to 0.8 based on Table 3.

Although in the above description, the scene type of an input image is determined based on a shooting mode set in the digital camera, this is not limitative, but the scene type determination may be performed by analyzing the input image 214. There are various methods of determining a scene type based on the input image 214, and a method using face detection processing can be mentioned as one example of the methods.

Figure 9:
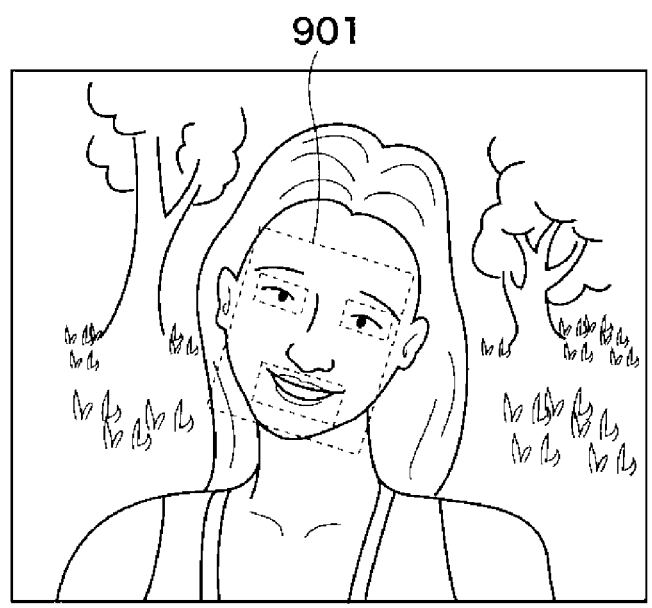
FIG. 9 is a schematic view useful in explaining how face detection processing is performed on an image.
Figure 10:
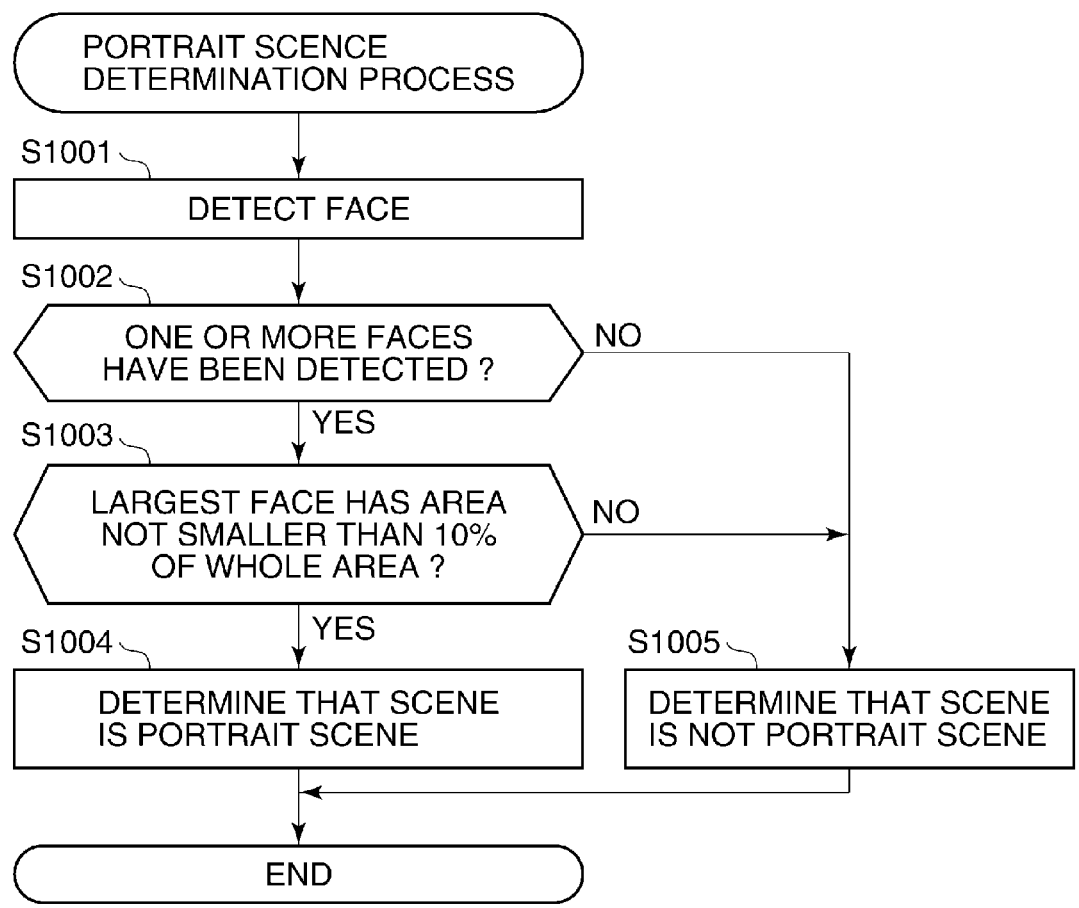
FIG. 10 is a flowchart of a portrait scene determination process executed using the face detection processing.

FIG. 9 is a schematic view useful in explaining how the face detection processing is performed on an image, and FIG. 10 is a flowchart of a portrait scene determination process using the face detection processing. The present process is executed by the controller 120.

First, face detection is performed on an image using e.g. a face detection method using Haar-Like feature values (step S1001), and it is determined whether or not one or more faces have been detected (step S1002). If no face has been detected (NO to the step S1002), it is determined that the scene is not the portrait scene (step S1005), followed by terminating the present process. On the other hand, if one or more faces have been detected (YES to the step S1002), it is further determined whether the area of a face area 901 of a largest face (on condition that more than one face exists) is not less than 10% of the area of the entire image (step S1003). If the area of the face area 901 is not less than 10% (YES to the step S1003), it is determined that the scene is the portrait scene (step S1004). If the area of the face area 901 is less than 10% (NO to the step S1003), it is determined that the scene is not the portrait scene (step S1005), followed by terminating the present process.

Figure 11:
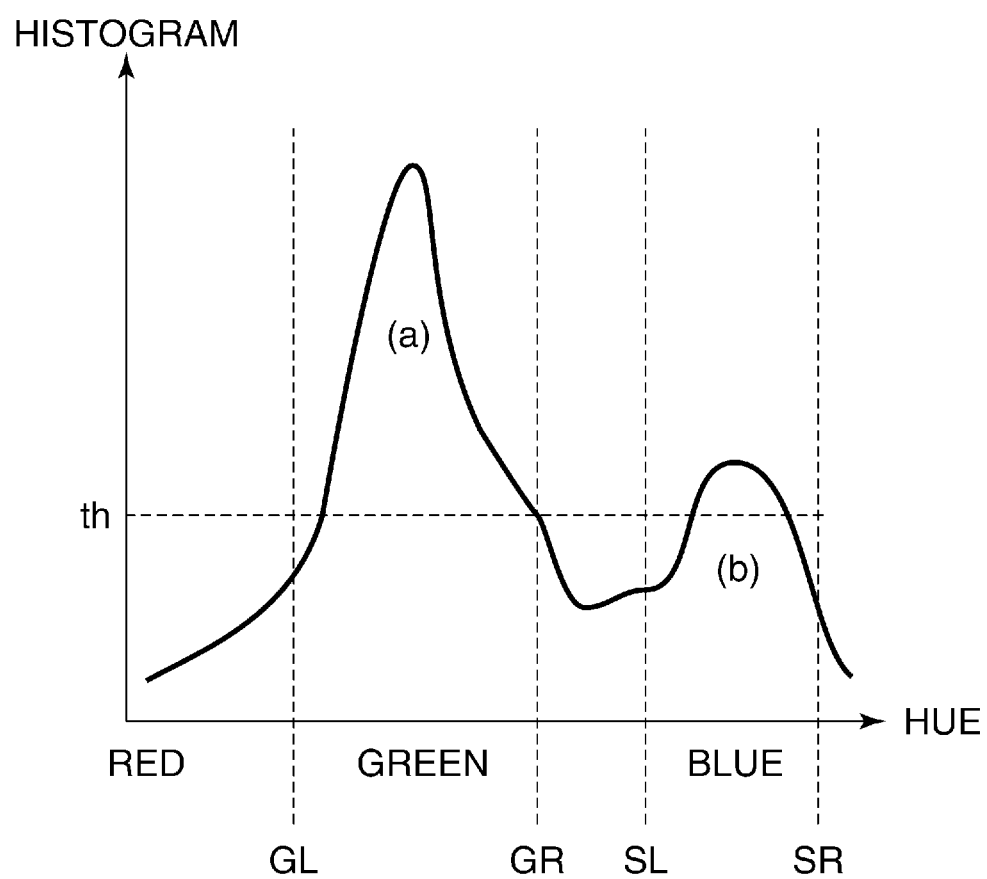
FIG. 11 is a diagram showing an example of a histogram of color signals of an input image.
Figure 12:
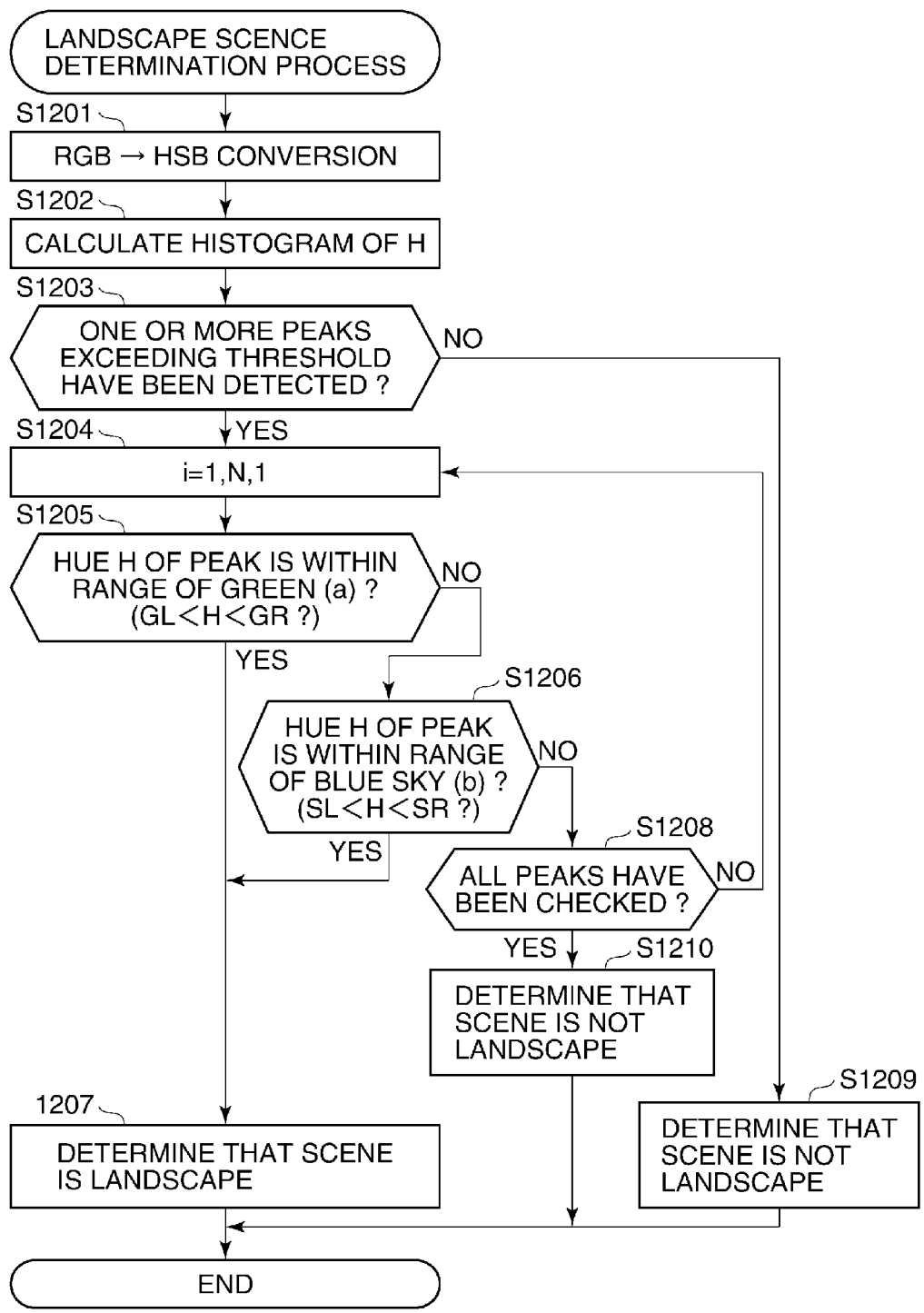
FIG. 12 is a flowchart of a landscape scene determination process executed through analysis of the histogram of the color signals of the input signal.

Alternatively, a method may be employed in which the scene of an input image is identified through analysis of a histogram of color signals of the input image. FIG. 11 is a diagram showing an example of the histogram of the color signals (H (hue)) of the input image, and FIG. 12 is a flowchart of a landscape scene determination process executed through analysis of the histogram of the color signals of the input image. The present process is executed by the controller 120.

First, RGB input signals are converted to HSB (Hue, Saturation, Brightness) (step S1201), and then a histogram of the H (hue) of the input image is calculated (step S1202). FIG. 11 shows the thus calculated histogram, and the histogram is analyzed, whereby it is determined whether or not there is one or more peaks exceeding a threshold value th (step S1203). If no such peak can be detected (NO to the step S1203), it is determined that the scene is not the landscape scene (step S1209), followed by terminating the present process. On the other hand, if one or more peaks are detected (YES to the step S1203), a variable i is set while setting the total number of the detected peaks as N so as to perform scene type determination on all the detected peaks (step S1204). The initial value of the variable i is set to 1, and the variable i is incremented by 1 each time until it reaches N.

Immediately after the variable i has been set, it is determined whether or not the hue of a first peak is within a green hue range (GL<H<GR) (step S1205). If the condition of GL<H<GR is satisfied (YES to the step S1205), there is a high probability that the peak represents green, and therefore it is determined that the scene is the landscape scene (step S1207). After execution of the step S1207, the present process is terminated even if another peak has been detected. If the condition of GL<H<GR is not satisfied (NO to the step S1205), it is further determined whether or not the hue of the peak is within a hue range of blue sky (SL<H<SR) (step S1206).

If the condition of SL<H<SR is satisfied (YES to the step S1206), there is a high probability that the peak represents blue sky, and therefore it is determined that the scene is the landscape scene (step S1207). If the condition of SL<H<SR is not satisfied (NO to the step S1206), it is determined whether or not the hues of all the peaks have been checked (step S1208). If the check on the hues of all the peaks has not been completed (NO to the step S1208), the process returns to the step S1205 so as to check the hue of a next peak. If the check on the hues of all the peaks has been completed, i.e. if the answer to the question of the step S1208 is affirmative (YES), neither the condition of GL<H<GR nor the condition of SL<H<SR is satisfied, and therefore it is determined that the scene is not the landscape scene (step S1210), followed by terminating the present process.

Note that in the histogram shown in FIG. 11, a peak indicated by a curve (a) satisfies the condition in the step S1205, so that it is determined that the scene is the landscape scene, followed by terminating the present process without performing determination on a peak indicated by a curve (b) in FIG. 11. In addition to the above-described method, a number of other methods for image scene analysis and identification are studied and are disclosed, and one of the other methods may be used in place of the gain setting method in the first embodiment, but further description thereof is omitted here.

As described above, in the gain setting method in the first embodiment, the synthesis gains optimized on a scene type-by-scene type basis are stored as presets in the form of tables, whereby it is possible to set synthesis gains tailored to a scene type identified based on shooting conditions. This makes it possible to add the same soft focus effects even to images having different input image sizes. Further, calculation processing is not newly required during shooting, it is possible to perform high-speed continuous shooting without reducing shooting frame speed.

Next, a second embodiment of the present invention will be described. The second embodiment is different from the first embodiment in the gain setting method, but the construction and the like other than this of the second embodiment are identical to those of the first embodiment, and hence corresponding component elements are denoted by the same reference numerals while omitting the description thereof. According to the gain setting method in the first embodiment, the synthesis gains 205 to 207 for adding the soft focus effects to a small-sized input image are set by storing the scene type-specific synthesis gain tables as presets, and selecting suitable settings therefrom according to the type of a scene. In contrast, in the gain setting method in the second embodiment, synthesis gains are calculated by analyzing the frequency characteristics of an input image.

Figure 13:
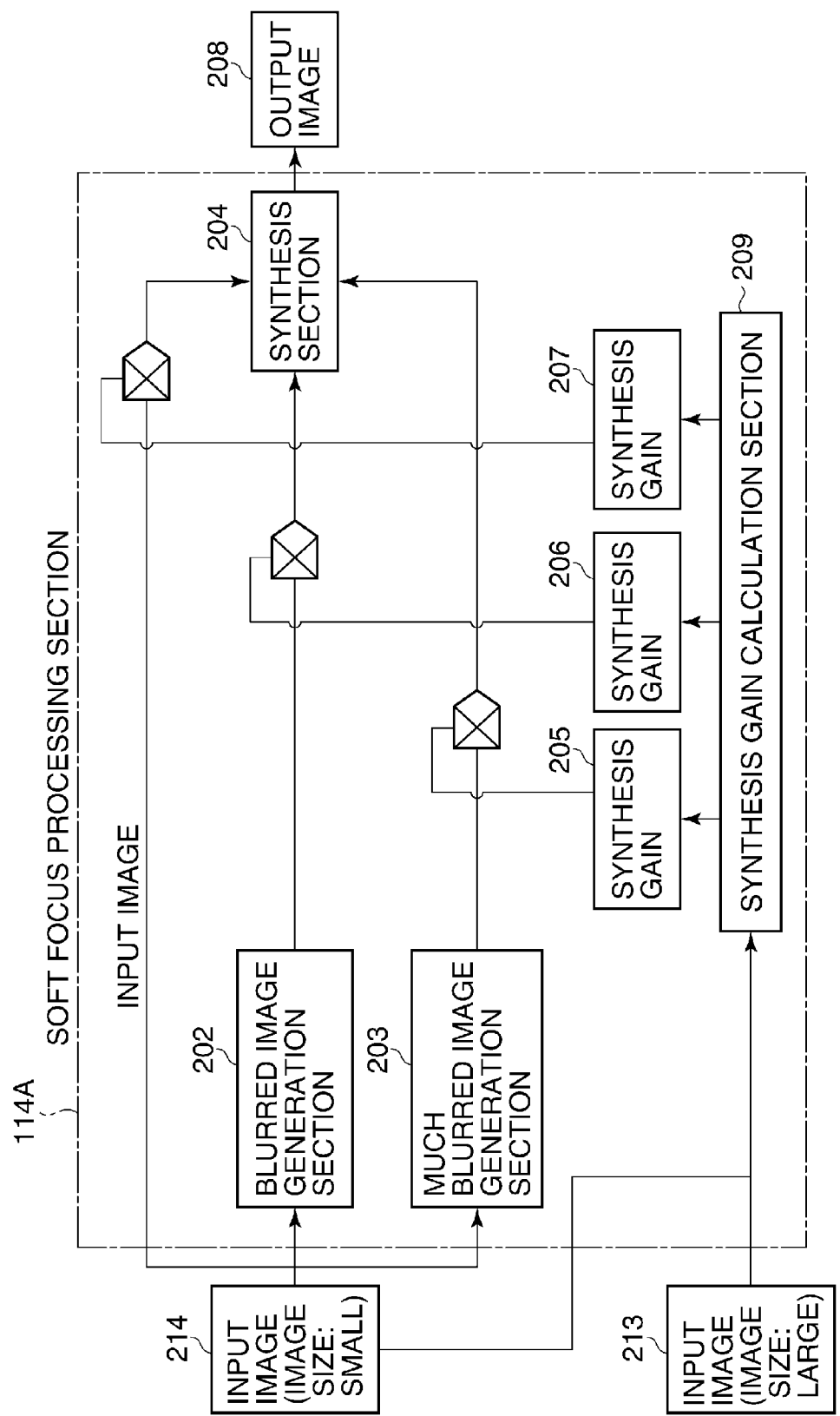
FIG. 13 is a schematic block diagram useful in explaining soft focus processing executed by a soft focus processing section of an image processing apparatus according to a second embodiment of the present invention.

FIG. 13 is a schematic block diagram useful in explaining soft focus processing executed by a soft focus processing section 114a for executing the gain setting method in the second embodiment. The soft focus processing section 114A appearing in FIG. 13 is used for execution of the gain setting method in the second embodiment in place of the soft focus processing section 114 appearing in FIGS. 1 and 5. The other component elements of the image processing apparatus are identical to those described with reference to FIG. 1. Further, the same component elements of the soft focus processing section 114A in FIG. 13 as those of the soft focus processing section 114 in FIG. 5 are identical in function, and therefore description thereof is omitted, with the same reference numerals denoting the same component elements, respectively.

In the gain setting method in the second embodiment, a small-sized input image 214 (first input image) and a large-sized input image 213 (second input image) are input to the synthesis gain calculation section 209 as two input images relatively different in image size so as to calculate the synthesis gains 205 to 207. The synthesis gain calculation section 209 analyzes the frequency characteristics of the respective input images 213 and 214.

Figure 14:
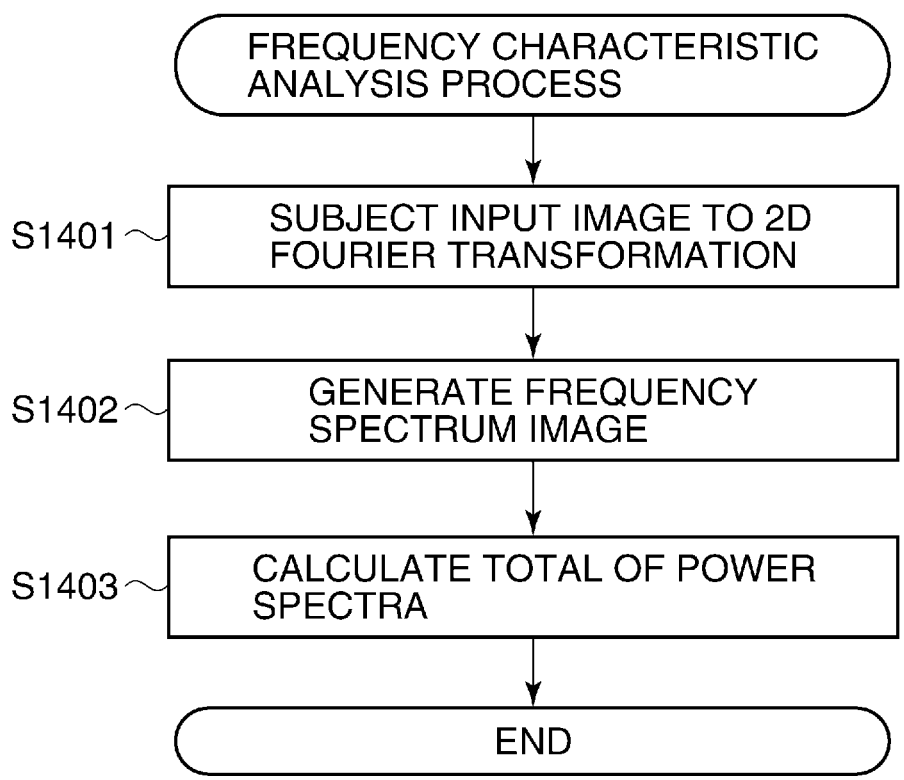
FIG. 14 is a flowchart of an input image frequency characteristic analysis process performed by the image processing apparatus according to the second embodiment.

FIG. 14 is a flowchart of an input image frequency characteristic analysis process. In the frequency characteristic analysis process, first, an input image is subjected to two-dimensional Fourier transformation (step S1401). Then, a frequency spectrum image in which the luminance represents the amplitude is generated (step S1402).

Figure 15A:
FIG. 15A is a view illustrating an example of an input image.
Figure 15B:
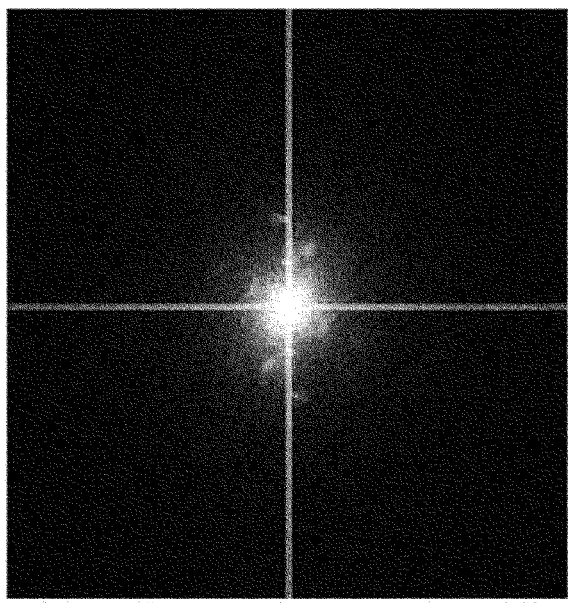
FIG. 15B is a view illustrating an example of a frequency spectrum image generated based on the input image in FIG. 15A.

FIG. 15A illustrates an example of the input image, and FIG. 15B illustrates an example of the frequency spectrum image generated based on the input image in FIG. 15A. In general, in an image, the amount of DC component is much larger than that of frequency components having amplitude, and if the actual amplitude is displayed without being processed, most of data other than the DC component will be lost. Therefore, a logarithm of amplitude is taken to thereby reduce the difference between the two types of components. Further, if the frequency spectrum image is displayed without being processed, the DC component as the origin is displayed at an end of the image. Therefore, data are rearranged on a quadrant basis such that the DC component is in the center of the frequency spectrum image. Thus, similarly to the method described with reference to FIGS. 6A, 6B, and 6C, the total of power spectra is calculated, and the average value ave of the frequency-power spectrum curve is determined (step S1403), followed by terminating the present process.

Figure 16A:
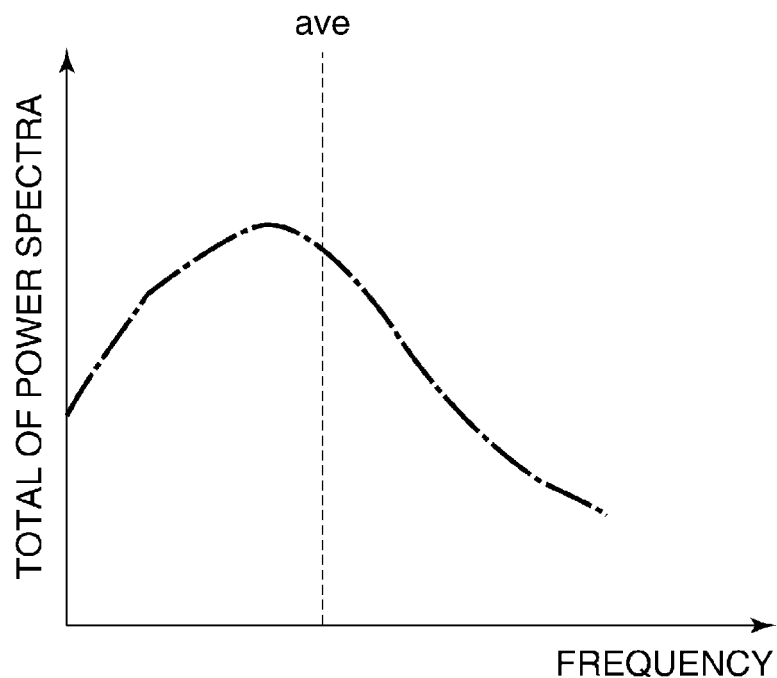
FIG. 16A is a diagram showing an example of a frequency-power spectrum curve obtained in a step of FIG. 14.
Figure 16B:
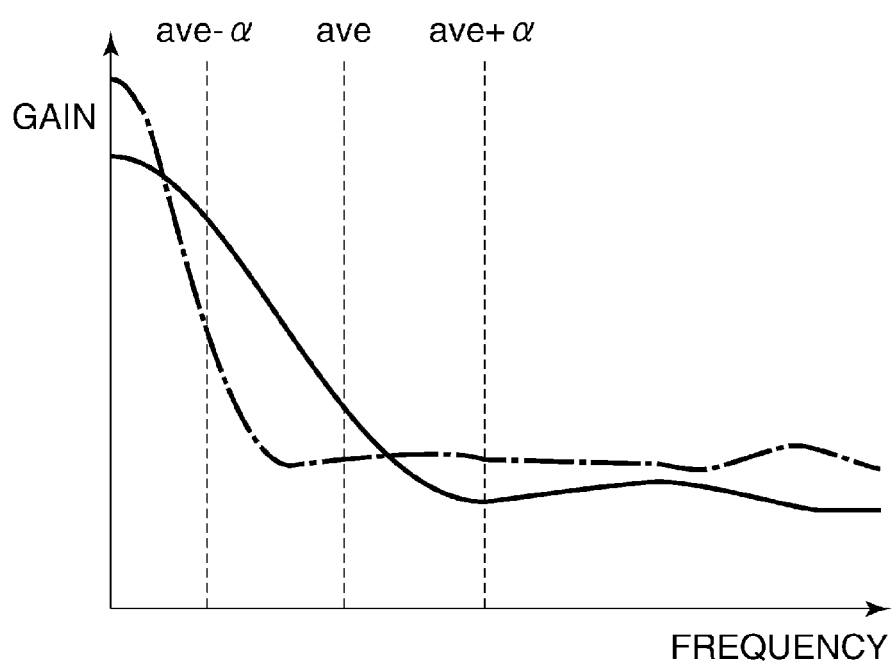
FIG. 16B is a schematic diagram useful in explaining a synthetic gain setting method.

FIG. 16A is a diagram showing an example of the frequency-power spectrum curve obtained in the step S1403, and FIG. 16B is a schematic diagram useful in explaining the method of setting the synthetic gains 205 to 207. As shown in FIG. 16B, the synthesis gains 205 to 207 are calculated which minimize the RMS errors within a frequency range of ±α [m$^{-1}$] with the average frequency ave (a) in the center.

Note that a solid line appearing in FIG. 16B represents the frequency characteristics of the soft focus processing performed on the large-sized input image 213, are determined separately in advance. A one-dot-chain line appearing in FIG. 16B represents the frequency characteristics of the soft focus processing performed on the small-sized input image 214 using initial values of the synthesis gains. In the present example, as the initial values of the synthesis gains, the synthesis gains 1 to 3 are equalized, i.e. set to 1/3:1/3:1/3. There are various methods of determining the synthesis gains for minimizing the RMS errors, and in the gain setting method in the second embodiment, it is possible to employ e.g. a method in which search is performed while changing gain values bit by bit within a range where the synthesis gains 205 to 207 can assume values.

According to the gain setting method in the second embodiment described above, the synthesis gains are set according to the frequency characteristics of an input image. This makes it possible to set the synthesis gains to values optimized for an input image, so that the same soft focus effects can be more accurately added even to input images different in image size than by the gain setting method in the first embodiment.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2010-185459 filed Aug. 20, 2010, which is hereby incorporated by reference herein in its entirety.

What is claimed is:

1. An image processing apparatus that performs soft focus processing on an image, the image processing apparatus comprising:
   a first acquisition unit configured to acquire an input image;
   a second acquisition unit configured to acquire a shooting condition for the acquired input image;
   a generation unit configured to generate a plurality of blurred images different in degree of blur from the same acquired input image;
   a synthesis unit configured to synthesize the acquired input image and at least one of the blurred images generated by said generation unit;
   a storage unit configured to store a synthesis ratio table including a set of predetermined synthesis ratios that are predetermined for a plurality of input images different in size from one another to achieve substantially the same soft focus effects regardless of the size of the acquired input image; and
   a setting unit configured to set a synthesis ratio between the images to be synthesized using the synthesis ratio table, according to the size of the acquired input image.

2. The image processing apparatus according to claim 1, wherein the shooting condition includes a shooting mode or a type of a shooting scene of the acquired input image.

3. The image processing apparatus according to claim 2, wherein:
   the type of the shooting scene includes a portrait scene, a landscape scene, and a normal scene different from the portrait scene and the landscape scene, and
   the image processing apparatus further comprises a shooting mode-setting unit configured to set, as the shooting condition, a shooting mode suitable for shooting at least one of the portrait scene, the landscape scene, or the normal scene.

4. The image processing apparatus according to claim 1, further comprising:
   a storage unit configured to store a plurality of synthesis ratio tables formed on a shooting condition-by-shooting condition basis and each containing combinations of synthesis ratios between the acquired input image and the at least one of the blurred images generated by said generation unit, and
   wherein said setting unit selects a synthesis ratio table corresponding to the shooting condition acquired by said acquisition unit, from the plurality of synthesis ratio tables, and determines a combination of the synthesis ratios to be used by said synthesis unit, based on the selected synthesis ratio table.

5. The image processing apparatus according to claim 4, wherein the combination of the synthesis ratios is determined based on at least one of the number of pixels of the acquired input image and a degree of effect of soft focus processing.

6. The image processing apparatus according to claim 1, wherein said generation unit generates the blurred images different in degree of blur by subjecting the acquired input image to reduction processing and then subjecting the resulting input image to enlargement processing.

7. The image processing apparatus according to claim 1, wherein:
   a first input image and a second input image relatively different from each other in the number of pixels are each input as the input image to said setting unit, and
   said setting unit calculates a synthesis ratio for soft focus processing to be performed on the second input image and a synthesis ratio for soft focus processing to be performed on the first input image, so that an error between transfer characteristics in a frequency range of the soft focus processing performed on the second input image and transfer characteristics in a frequency range of the soft focus processing performed on the first input image is minimized.

8. The image processing apparatus according to claim 1, wherein:
   the plurality of blurred images include a much blurred image, and
   the set of predetermined synthesis ratios included in the synthesis ratio table are set so that as the size of the acquired input image is smaller, the synthesis ratio for the much blurred image is lower.

9. The image processing apparatus according to claim 2, wherein:

the synthesis ratio table is preset for each type of a shooting scene, and the setting unit sets a synthesis ratio between the images to be synthesized using the synthesis ratio table according to the a shooting scene of the acquired input image.

10. A method of controlling an image processing apparatus to perform soft focus processing on an image, which is executed by at least one processor provided in the image processing apparatus, the method comprising the steps of:

acquiring an input image;

acquiring a shooting condition for the acquired input image;

generating a plurality of blurred images different in degree of blur from the same acquired input image;

synthesizing the acquired input image and at least one of the generated blurred images;

storing a synthesis ratio table including a set of predetermined synthesis ratios that are predetermined for a plurality of input images different in size from one another to achieve substantially the same soft focus effects regardless of the size of the acquired input image; and setting a synthesis ratio between the images to be synthesized using the synthesis ratio table, according to the size of the acquired input image.

11. A non-transitory computer-readable storage medium storing a computer-readable program executable by a computer to execute a method of controlling an image processing apparatus to perform soft focus processing on an image, wherein the method comprises the steps of:

acquiring an input image;

acquiring a shooting condition for the acquired input image;

generating a plurality of blurred images different in degree of blur from the same acquired input image;

synthesizing the acquired input image and at least one of the generated blurred images;

storing a synthesis ratio table including a set of predetermined synthesis ratios that are predetermined for a plurality of input images different in size from one another to achieve substantially the same soft focus effects regardless of the size the acquired input image; and setting a synthesis ratio between the images to be synthesized using the synthesis ratio table, according to the size of the acquired input image.

12. An image processing apparatus that performs soft focus processing on an image, the image processing apparatus comprising:

a first acquisition unit configured to acquire an input image;

a second acquisition unit configured to acquire a shooting condition for the acquired input image;

a generation unit configured to generate a plurality of blurred images different in degree of blur from the same acquired input image;

a synthesis unit configured to synthesize the acquired input image and at least one of the blurred images generated by said generation unit;

a storage unit configured to store a synthesis ratio table including a set of predetermined synthesis ratios that are predetermined for a plurality of input images different in size from one another; and a setting unit configured to set a synthesis ratio between the images to be synthesized using the synthesis ratio table, according to the size of the acquired input image.

13. The image processing apparatus according to claim 12, wherein said generation unit generates the blurred images different in degree of blur by subjecting the acquired input image to reduction processing and then subjecting the resulting input image to enlargement processing.

14. The image processing apparatus according to claim 12, wherein:

the plurality of blurred images include a much blurred image, and the set of predetermined synthesis ratios included in the synthesis ratio table are set so that as the size of the acquired input image is smaller, the synthesis ratio for the much blurred image is lower.

15. The image processing apparatus according to claim 12, wherein:

the shooting condition includes a type of a shooting scene of the acquired input image, the synthesis ratio table is preset for each type of a shooting scene, and the setting unit sets a synthesis ratio between the images to be synthesized using the synthesis ratio table according to the shooting scene of the acquired input image.

* * * * *